US011242435B2

(12) United States Patent
Chen et al.

(10) Patent No.: US 11,242,435 B2
(45) Date of Patent: Feb. 8, 2022

(54) VULCANIZATION COMPOSITION FOR REDUCING ALLERGENIC POTENTIAL AND ELASTOMERIC ARTICLES FORMED THEREWITH

(71) Applicant: Allegiance Corporation, Dublin, OH (US)

(72) Inventors: Seong Fong Chen, Gelugor (MY); Wei Cheong Wong, Kulim (MY)

(73) Assignee: ALLEGIANCE CORPORATION, Dublin, OH (US)

( * ) Notice: Subject to any disclaimer, the term of this patent is extended or adjusted under 35 U.S.C. 154(b) by 36 days.

(21) Appl. No.: 16/924,953

(22) Filed: Jul. 9, 2020

(65) Prior Publication Data

US 2020/0339767 A1 Oct. 29, 2020

Related U.S. Application Data

(63) Continuation of application No. 16/216,640, filed on Dec. 11, 2018, now Pat. No. 10,759,913.

(60) Provisional application No. 62/598,048, filed on Dec. 13, 2017.

(51) Int. Cl.
| | | |
|---|---|---|
| *C08J 3/26* | (2006.01) | |
| *C08K 5/38* | (2006.01) | |
| *C08K 3/22* | (2006.01) | |
| *C08K 3/06* | (2006.01) | |
| *C08L 61/22* | (2006.01) | |
| *C08L 21/02* | (2006.01) | |
| *C08L 9/00* | (2006.01) | |
| *C08L 7/00* | (2006.01) | |

(52) U.S. Cl.
CPC .................. *C08J 3/26* (2013.01); *C08K 3/06* (2013.01); *C08K 3/22* (2013.01); *C08K 5/38* (2013.01); *C08L 7/00* (2013.01); *C08L 9/00* (2013.01); *C08L 21/02* (2013.01); *C08L 61/22* (2013.01); *C08J 2321/02* (2013.01); *C08J 2461/20* (2013.01); *C08K 2003/2296* (2013.01); *C08L 2312/00* (2013.01)

(58) Field of Classification Search
CPC ...... C08J 3/26; C08J 2321/02; C08J 2307/02; C08J 5/02; C08J 2461/20; C08J 2309/02; C08L 9/00; C08L 7/00; C08L 61/22; C08L 21/02; C08L 2312/00; C08K 5/38; C08K 3/22; C08K 3/06; C08K 2309/02
See application file for complete search history.

(56) References Cited

U.S. PATENT DOCUMENTS

| | | | | |
|---|---|---|---|---|
| 1,417,970 | A * | 5/1922 | Cadwell .................. | C08K 5/29 525/164 |
| 2,781,288 | A * | 2/1957 | Polmanteer ............ | B32B 25/16 428/447 |
| 3,626,052 | A * | 12/1971 | Sisco ....................... | B64B 1/58 264/301 |
| 4,258,105 | A * | 3/1981 | Williams ............. | C09D 167/00 428/431 |
| 4,396,756 | A * | 8/1983 | Baur ..................... | C08G 14/06 528/162 |
| 4,695,609 | A * | 9/1987 | Stevenson ................ | C08K 5/38 525/330.9 |
| 2012/0021155 | A1 * | 1/2012 | Chen ..................... | C08K 5/0025 428/36.8 |

FOREIGN PATENT DOCUMENTS

| | | |
|---|---|---|
| FR | 613040 A | 11/1926 |
| GB | 220320 A | 6/1925 |

OTHER PUBLICATIONS

Anna, Daniel, "Chemical Protective Clothing", p. 15, 2003. (Year: 2003).*

European Search Report issued in European Patent Application No. EP 18888314 dated Jul. 13, 2021.

* cited by examiner

*Primary Examiner* — Christopher M Rodd
(74) *Attorney, Agent, or Firm* — Arent Fox, LLP

(57) ABSTRACT

An elastomeric article having a rubber component comprising polyisoprene and an aldehyde aniline condensate, the elastomeric article having less than 1 ppm diisopropyl xanthogen polysulfide residue.

20 Claims, No Drawings

VULCANIZATION COMPOSITION FOR REDUCING ALLERGENIC POTENTIAL AND ELASTOMERIC ARTICLES FORMED THEREWITH

CLAIM OF PRIORITY UNDER 35 U.S.C. § 119

The present application for patent is a Continuation of U.S. patent application Ser. No. 16/216,640, entitled "VULCANIZATION COMPOSITION FOR REDUCING ALLERGENIC POTENTIAL AND ELASTOMERIC ARTICLES FORMED THEREWITH" filed Dec. 11, 2018, which claims priority to U.S. Provisional Application No. 62/598,048, titled "VULCANIZATION COMPOSITION FOR REDUCING ALLERGENIC POTENTIAL AND ELASTOMERIC ARTICLES FORMED THEREWITH," filed Dec. 13, 2017, the disclosures of which are incorporated herein by reference in their entirety.

BACKGROUND

The invention relates generally to vulcanization compounds and relates more specifically to vulcanization compositions with reduced allergenic potential that include accelerator compositions for vulcanizing elastomeric articles.

There are two types of allergies associated with the use of elastomeric articles in the medical field: (a) Type I immediate hypersensitivity, IgE-mediated allergies; and (b) Type IV delayed hypersensitivity, cell-mediated allergies.

Type I hypersensitivity reactions are mediated by IgE immunoglobulin, and the effect is immediate. Generally, symptoms are evident within minutes of exposure to the allergen, and may include local urticaria, facial swelling, watery eyes, rhinitis, asthma, and in extremely rare occasions, anaphylactic shock. Type I allergies have been linked to the residual, extractable proteins present in natural rubber latex products.

Various technologies are available for reducing the extractable proteins in latex gloves, such as water leaching, chlorination, and the use of low-protein or deproteinized latex. However, healthcare personnel and patients who are allergic to natural rubber latex proteins are advised to use synthetic gloves. Commonly-used synthetic materials include polyisoprene, acrylonitrile-butadiene (nitrile), polychloroprene (Neoprene), polyurethane, and polyvinyl chloride.

As a result of the prevalence of Type I reactions in response to contact with natural rubber proteins, there has been a shift towards the use of synthetic latexes that do not contain natural rubber latex proteins, especially for use in making medical devices that come into contact with the skin. Taking cost and performance into consideration, synthetic latexes that are suitable for glove manufacture include nitrile latex and polyurethane latex for examination gloves, and polychloroprene latex and polyisoprene latex for surgical gloves. For surgical gloves, polyisoprene latex has typically been preferred over polychloroprene, even though it is more expensive, because it provides the gloves with properties that mimic those of natural rubber, particularly tensile strength, ultimate elongation, softness and comfortable feel.

However, Type IV allergic reactions can be caused by natural or synthetic elastomeric articles. Synthetic latexes can still cause allergic reactions due to the use of certain chemicals that may be found in the compounded latex. Type IV delayed hypersensitivity reactions are cell-mediated allergic responses to specific chemicals. Symptoms only become apparent about 48-96 hours after contact. Chemicals that may induce Type IV allergic responses include vulcanization accelerators such as thiurams, mercaptobenzothiazoles, dithiocarbamates, diphenylguanidines, and thioureas, which are used in the process of preparing the elastomeric articles. The U.S. Food and Drug Administration (FDA) acknowledges that thiazoles, thiurams, and carbamates in rubber products can induce Type IV allergic reactions in humans. "Guidance for Industry and FDA Reviewers/Staff: Premarket Notification [510(k)] Submissions for Testing for Skin Sensitization to Chemicals in Natural Rubber Products," U.S. Department of Health and Human Services (1999). Hence, it is important to minimize the level of accelerators used so that the residual accelerator in the finished elastomeric article is very low.

Elastomeric articles are generally manufactured using a latex dipping process, which involves dipping molds or formers into a coagulant solution (usually aqueous calcium nitrate). After evaporating off the solvent, the coagulant-coated molds/formers are then dipped into compounded latex such that a film of coagulated rubber particles is deposited thereon. After gelling the latex film using heat, the wet-gelled latex film is leached in water and then dried and vulcanized in a hot air oven. During vulcanization the rubber molecules are chemically crosslinked.

Most commonly, the crosslinking agent is sulfur. However, sulfur alone is inefficient for forming crosslinks. Conventionally, sulfur has always been used in combination with vulcanization accelerators and activators.

Vulcanization accelerators are usually organic compounds that increase the rate and efficiency of sulfur crosslinking, while activators are compounds that increase the efficiency of the accelerators. Examples of accelerators used in latex compounding include thiurams, dithiocarbamates, mercaptobenzthiazole, diphenylguanidine, and thioureas. After vulcanization, depending on the amount of the accelerator used, some or most of the accelerators are chemically bonded to the rubber matrix, but some are unreacted and may remain as a residue in the finished elastomeric article.

Vulcanization activators used in latex compounding are usually metal oxides, such as zinc oxide, magnesium oxide, and lead oxide.

Various methods for minimizing or eliminating Type IV allergic reactions caused by vulcanization accelerators have been attempted, including crosslinking without the use of sulfur and vulcanization accelerators. Approaches include (a) crosslinking using gamma irradiation, (b) crosslinking using organic peroxides, (c) crosslinking using zinc oxide alone, via carboxyl-zinc ionic bonding, and (d) introducing functional groups into the polymer backbone that can form crosslinks after the product has been fabricated. Generally speaking, all of these approaches suffer from drawbacks. For example, approaches (a) and (b) result in products having poorer physical properties and poorer aging resistance than sulfur-vulcanized products.

Another approach is the use of safer accelerators. These are accelerators that have a lower allergenic potential. For example, a high-molecular weight accelerator that has low allergenic potential may be used, including, e.g., zinc dibenzyl dithiocarbamate (ZBEC), and zinc diisononyl dithiocarbamate (ZDNC). By virtue of their high molecular weights, these types of accelerators are more compatible with natural rubber and synthetic polyisoprene rubber, and therefore have a higher solubility in the rubber matrix. As a result, very little of the high-molecular weight accelerator would bloom to the rubber surface and come in contact with the user to cause a potential allergic reaction. For the same reason, very little of the high-molecular weight accelerator can be extracted from the rubber. ZDNC is preferred over ZBEC because it has a higher solubility in natural rubber (about 3% weight/weight), whereas the solubility of ZBEC is only about 0.5% weight/weight.

A further approach is to use combinations of fugitive accelerators, i.e., accelerators that are completely used up during vulcanization, leaving no residue in the product. Examples of such fugitive accelerators include dihydrocarbyl xanthogen polysulfides (which includes dialkyl xanthogen polysulfides) [short form "xanthogen polysulfides"] comprising diisopropyl xanthogen polysulfide (DIXP), diisopropyl xanthogen disulfide, diisopropyl xanthogen trisulfide, diisopropyl xanthogen tetrasulfide, diisopropyl xanthogen pentasulfide, diisoamyl xanthogen trisulfide, diisoamyl xanthogen tetrasulfide, diisoamyl xanthogen pentasulfide, diethyl xanthogen tetrasulfide, dibutyl xanthogen tetrasulfide, dibutyl xanthogen disulfide.

Using DIXP as a typical example, heating DIXP alone to high temperatures does not volatalize or decompose it completely to gaseous products. However, when DIXP is used together with sulfur and zinc oxide for crosslinking a diene containing polymer or rubber, it is consumed completely to form sulfur crosslinks, isopropanol and carbon disulfide as the major reaction products, leaving behind virtually no residue on the polymer or rubber since isopropanol and carbon disulfide would volatilize at the crosslinking/vulcanization temperatures. Since DIXP does not contain nitrogen in its chemical structure, it is also impossible to generate N-nitrosamines, which are associated with thiuram and dithiocarbamate accelerators. Additionally, certain nitrosamines are believed to be carcinogenic, and their formation should be avoided. However, DIXP alone does not accelerate sulfur crosslinking sufficiently to produce enough sulfur crosslinks to yield useful products, especially in polyisporene articles. The resulting articles have a tensile strength that is too low. Hence, DIXP has always been used in conjunction with other accelerators.

A variety of accelerator compositions have been disclosed in the prior art, some of which are discussed below.

Terminology 1.0 phr of an ingredient refers to 1.0 part dry weight of the ingredient per 100 parts dry weight of rubber.

Abbreviations: DIXP—diisopropyl xanthogen polysulfide, TMTD—tetramethylthiuram disulfide, ZMBT—zinc mercaptobenzothiazole, ZDBC—zinc dibutyl dithiocarbamate, ZDEC—zinc diethyl dithiocarbamate, DPG—diphenyl guanidine, ZDNC—zinc diisononyl dithiocarbamate, MBT—mercaptobenzothiazole, SDBC—sodium dibutyl dithiocarbamate, SDEC—sodium diethyl dithiocarbamate, SIX—sodium isopropyl xanthate, ZIX—zinc isopropyl xanthate.

U.S. Pat. No. 4,695,609 to Stevenson discloses accelerator systems used to cure a vulcanizable rubber composition comprising dihdrocarbyl xanthogen polysulfide (1.5-4 phr DIXP) and metal hydrocarbyl xanthate (0.05-5 phr zinc isopropyl/isobutyl xanthate) and less than 0.4 phr of nitrosatable materials.

U.S. Pat. No. 5,254,635 to Stevenson discloses a sulfur free rubber vulcanizable composition comprising dihydrocarbyl xanthogen polysulfide (1-6 phr), dibenzylthiuram sulfide (up to 1.5 phr), a xanthate compound (0-5 phr) and less than 0.2 phr of nitrosatable materials.

U.S. Pat. No. 6,618,861 to Saks discloses a polyisoprene composition comprising an accelerator system comprising 2 phr TMTD, 0.2 phr ZMBT, 0.2 phr ZDBC, 0.2 phr diphenyl thiourea and 0.2 phr ZDEC.

U.S. Published Application No. 2003/0161975 to Lucas et al. discloses the use of sulfur and DIXP, together with tetrabenzyl thiuram disulfide or ZBEC to produce polyisoprene condoms that are defect-free. The latex compound has improved stability compared to latexes formed using conventional accelerators such as zinc diethyl dithiocarbamate and zinc dibutyl dithiocarbamate. The accelerator composition comprises 1.5 phr DIXP and 0.6 phr tetrabenzyl/tetraethyl thiuram disulfide.

U.S. Pat. Nos. 6,828,387 and 8,273,810 to Wang et al. disclose formulations for polyisoprene using accelerator composition comprising a dithiocarbamate, a thiazole, and a guanidine wherein the dry weight of each ranges from about 0.50 to about 1.00 phr. Example 1 representing a summary of the accelerator composition comprises 0.50 phr ZDEC, 0.50 phr ZMBT and 1.00 phr DPG.

A synergistic combination of DIXP and ZDNC has been recommended as a safer accelerator for use with natural rubber latex and synthetic polyisoprene latex. Chakraborty et al., "Novel Sustainable Accelerators for Latex Applications—Update," *International Latex Conference* (2005).

For vulcanizing polychloroprene, conventional curing packages include sulfur, non-fugitive accelerators, and zinc oxide. Non-fugitive accelerators that are used include zinc dibutyl dithiocarbamate (ZDBC); a mixture of tetraethylthiuram disulfide and sodium dibutyl dithiocarbamate; and a mixture of diphenyl thiourea (thiocarbanilide) and diphenyl guanidine (see Carl, Neoprene Latex, chapter 3, published by E. I., du Pont de Nemours & Co. (1962)). However, residuals of these non-fugitive accelerators in the product can induce Type IV allergic reactions.

Chakraborty et al. (*2nd International Rubber Glove Conference* 2004, Kuala Lumpur, Malaysia) discloses formulations using sulfur, two combinations of two accelerators (ZDNC and DIXP, or ZDEC and MBT), zinc oxide, and two antioxidants (A02246 and MMBI). Chakraborty et al. discloses a safer accelerator system and a conventional accelerator sysem for PI latex. The former system comprises 0.4 phr DIXP and 0.4 phr ZDNC whilst the later system comprises 0.5 phr ZDEC and 0.5 phr MBT. For the DIXP/ZDNC composition, the compounded latex requires maturation at 30° C. for 8 days before the latex films gives good tensile strength properties. The films for testing are prepared by casting the latex on glass plates and allowed to dry at ambient temperature before curing them. This method for forming films is different from that used for commercial production of gloves which is by "coagulant dipping".

Virdi et al. (Presentation at 8th International Rubber Glove Conference and Exihition 2016, Kuala Lumpur, Malaysia) discloses accelerator composition for synthetic polyisoprene comprising DIXP (0.5 phr) and ZDNC (0.5 phr) in combination with a metal xanthate (0.3 SIX or 0.3 ZIX) that yields coagulant dipped films that have good tensile strength values that can meet ASTM D3577 standard specification for rubber surgical gloves (Type II synthetic latex gloves). The compounded latex is matured at 30° C. or 35° C. for 24 hours before films are formed by coagulant dipping. They also show that accelerator composition comprising 0.5 phr DIXP and 0.5 phr ZDNC without the metal xanthate (composition disclosed by Chakraborty et al. above) yields coagulant dipped films that have very poor tensile strength properties. This finding is very different from that of Chakraborty et al who found that films formed by casting on glass plates gave good tensile strength properties.

U.S. Pat. No. 7,041,746 to Dzikowicz discloses an accelerator system for synthetic polyisoprene comprising dithiocarbamate (0.5-4.0 phr), thiourea (0.2-4.0 phr) and optionally thiazole (0.5 phr).

U.S. Pat. No. 8,087,412 to Lucas et al. discloses pre-vulcanization composition and post vulcanization composition for synthetic polyisoprene articles (condoms and gloves) where the pre-vulcanization accelerator system comprises ZDEC/ZDBC (0.4-1.0 phr) and the post vulcanization accelerator system comprises SDBC/SDEC (0.05-0.50 phr) and DIXP/xanthogen sulfide/thiuram (0.2-0.6 phr).

U.S. Pat. No. 8,673,172B2 to Van Jole discloses latex accelerator formulations for synthetic rubber latex derived from the group consisting of a conjugated diene monomer (e.g. polyisoprene) and a conjugated diene monomer with a vinyl aromatic comonomer using accelerator composition comprising DIXP, an alkyldithiocarbamate and DPG wherein each of the accelerator composition are present in a concentration from 0.25 to 1.00 phr.

U.S. Pat. No. 8,980,391 to Chen et al. discloses polychloroprene articles having low allergenic potential made by using vulcanization composition comprising sulfur, zinc oxide and a fugitive accelerator (DIXP) that leaves no detectable residual DIXP in the formed article. Surgical gloves made have good tensile strength that meets ASTM D3577 specification. This is feasible due to sulfur crosslinking and also crosslinking between polymer chains facilitated by the reactive tertiary allylic chlorine atoms on the polymers chains with zinc oxide as catalyst. See Carl, Neoprene Latex, chapter 3.

US patent application 2015/0128329A1 to Amarasekera et al. discloses a glove comprising a latex composition comprising a polyisoprene polymer, a first accelerator comprising a thiourea, a benzothiazole sulphenamide, a thiazole or a dithiocarbamate or combinations thereof; and a second accelerator comprising a thiuram or a xanthogen polysulfide or combination thereof. In the three Examples given (Examples 1-3), the total level of non-fugitive accelerators (thiourea, benzothiazole sulphenamide/thiazole, dithiocarbamate and thiuram) was 1.4-1.5 phr whilst xanthogen polysulfide level was 0.3 phr.

US patent application 2016/0108154A1 to Krutzer discloses an accelerator system comprising 0.5 to 10 phr of a thiuram as sulfur donor (thiuram is known to function as an accelerator and a sulfur donor) and 0.05 to 2.0 phr of a thiocarbamate or combination of dithiocarbamates for use with synthetic isoprene polymer including polyisoprene.

Aldehyde-amines are reaction products of various aldehydes and amines and known to be used as dry rubber accelerators as early as mid-1910. Common aldehyde-amine accelerators are aldehyde anilines butyraldehyde-aniline and heptaldehyde-aniline (HA). Aldehyde-amine accelerators now have limited use. These accelerators can be used for hard rubber such as ebonite. When used, 2.5 phr of this accelerator might be used with 30-50 phr sulfur. These are more commonly used as a secondary accelerator at 0.20-0.30 phr with thiazole or sulfenamide accelerators. (Rubber Compounding: Principles, Materials, and Techniques. Second Edition by Fred W. Barlow p110, Marcel Dekker, Inc, New York, 1993). Accelerators that are used for dry rubber can be used for latex rubber although their effectiveness and efficiency may not be the same. HA is not known to be used for the manufacture of rubber gloves. Use of "xanthogen polysulfide" in combination with other accelerators for curing dry rubber and latex has been disclosed by Stevenson (U.S. Pat. Nos. 4,695,609; 5,254,635). Combination of aldehyde-anilines with DIXP has never been considered.

Accordingly, there is a need in the art for simpler vulcanization compositions used to vulcanize elastomeric articles with low amounts of accelerator, where the vulcanization compositions have reduced allergenic potential, specifically for polyisoprene applications. The present inventive composition combines low amounts of an additional accelerator that does not include conventional accelerators such as dithiocarbamates, thiazoles, thiurams, guanidines and thioureas in combination with the fugitive accelerator DIXP. The present invention utilizes an aldehyde-aniline, as the additional accelerator, which is effective at low levels. The present invention also relates to polyisoprene-based elastomeric articles formed using the vulcanization compositions. The invention also relates to methods for making a reduced allergenicity vulcanization composition, and to methods for using the vulcanization compositions to vulcanize elastomeric articles.

SUMMARY OF THE INVENTION

Certain aspects of the present disclosure are directed toward vulcanization compositions having accelerator compositions that are used to vulcanize elastomeric articles. The vulcanization compositions have reduced allergenic potential as compared to vulcanization compositions having higher levels of non-fugitive and fugitive accelerator compositions, and may be used to form elastomeric articles that have reduced allergenic potential as compared to elastomeric articles formed using vulcanization compositions having higher levels of accelerator compositions. The invention further relates to methods for making a reduced allergenicity vulcanization composition, and to methods for using the vulcanization compositions to vulcanize elastomeric articles.

The present invention meets the unmet needs of the art, as well as others, by providing vulcanization compositions, latex dispersions, and elastomeric articles that exhibit reduced or eliminated allergic potential as compared to vulcanization compositions, latex dispersions, and elastomeric articles formed using conventional techniques. According to some aspects, the present invention results in reduced or eliminated Type I and Type IV allergenicity. The vulcanization compositions, latex dispersions, elastomeric articles, and methods of the present invention are beneficial for avoiding problems associated with allergic reactions to elastomeric articles, particularly in the medical field, where both health care providers and patients are exposed to these potential sources of allergens frequently and/or for extended periods of time.

According to one aspect of the invention, the invention relates to a vulcanization composition comprising a combination of fugitive xanthogen polysulfide accelerators and aldehyde-aniline accelerators, According to another aspect of the invention, the invention relates to a vulcanization composition comprising a single fugitive xanthogen polysulfide accelerator, and a single aldehyde-aniline accelerator, where the vulcanization composition does not include any additional accelerators. According to another aspect of the invention, the invention relates to a vulcanization composition comprising diisopropyl xanthogen polysulfide and heptaldehyde-aniline condensate as accelerators. According to some aspects, the vulcanization composition exhibits reduced allergenicity as compared to vulcanization compositions comprising non-fugitive accelerators and higher levels of accelerators.

According to further aspects, the elastomer is polyisoprene. The polyisoprene can be natural rubber polyisoprene or synthetic polyisoprene. According to still further aspects, the latex formulation may be used to form elastomeric articles that may include, but are not limited to, gloves (specifically medical gloves, and more specifically examination and surgical gloves), as well as condoms, probe covers, dental dams, finger cots, and catheters.

Any feature, structure, or step disclosed herein can be replaced with or combined with any other feature, structure, or step disclosed herein, or omitted. Furthermore, for purposes of summarizing the disclosure, certain aspects, advantages, and features of the devices have been described herein. It is to be understood that not necessarily any or all such advantages are achieved in accordance with any particular embodiments disclosed herein. No individual aspects of this disclosure are essential or indispensable.

DETAILED DESCRIPTION

The detailed description set forth below is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details.

The present invention generally relates to vulcanization compositions including accelerator compositions used to vulcanize elastomeric articles, where the accelerator compositions have reduced allergenic potential as compared to elastomeric articles formed using vulcanization compositions having higher accelerator compositions. The vulcanization compositions comprise a fugitive vulcanization accelerator and an additional accelerator. The additional accelerator is in amounts significantly lower than those of prior art compositions. The present invention also relates to latex dispersions and elastomeric articles formed using the vulcanization compositions. The present invention further relates to methods for making a reduced allergenicity vulcanization composition, and to methods for using the vulcanization compositions to vulcanize elastomeric articles.

Fugitive vulcanization accelerators for use in accordance with the present invention include xanthogen polysulfides. Diisopropyl xanthogen polysulfide (DIXP), diisopropyl xanthogen disulfide, diisopropyl xanthogen trisulfide, diisopropyl xanthogen tetrasulfide, diisopropyl xanthogen pentasulfide, diisoamyl xanthogen trisulfide, diisoamyl xanthogen tetrasulfide, diisoamyl xanthogen pentasulfide, diethyl xanthogen tetrasulfide, dibutyl xanthogen tetrasulfide and dibutyl xanthogen disulfide are preferred fugitive xanthogen polysulfides that may be used in accordance with the present invention, and it is envisioned that additional fugitive xanthogen polysulfides that may be developed in the future will also find use in the accelerator compositions, latex dispersions, and elastomeric articles of the present invention. Fugitive xanthogen polysulfides are useful in the accelerator compositions of the vulcanization compositions of the present invention because during vulcanization they are consumed by bonding to the rubber matrix, and form gases and/or volatile liquids as by-products that evaporate at the high temperatures used for vulcanization, thereby leaving no residue on the elastomeric article. In the case of diisopropyl xanthogen polysulfide (DIXP), the compound forms isopropyl alcohol and carbon disulfide gas as by-products.

Additional accelerator compositions utilized in this invention include aldehyde—anilines. The inventive accelerators include heptaldehyde-aniline (HA) and butyraldehyde-aniline (BA), but other aldehyde-anilines may be use. Specifically, the aldehyde anilines are condensates. In a preferred embodiment, heptaldehyde-aniline (HA) is the additional accelerator.

The present invention also provides elastomeric articles made from polyisoprene rubber and vulcanized using aldehyde-anilines as an additional accelerator and xanthogen polysulfide accelerators. According to some aspects, the elastomeric articles may include gloves (specifically medical gloves, and more specifically examination and surgical gloves), as well as condoms, probe covers, dental dams, finger cots, and catheters. According to certain aspects polyisoprene surgical and examination gloves made using such an accelerator composition are provided.

Elastomeric articles made using high amounts of accelerator compositions, especially non-fugitive accelerators, contain residual accelerators that could cause Type IV allergic reactions in humans, and elastomeric articles made using natural rubber contain extractable latex proteins that are linked to Type I allergic reactions in humans. Because the elastomeric articles, accelerator compositions, latex compositions, methods of making accelerator compositions, and methods of vulcanizing elastomeric articles in accordance with the present invention do not incorporate natural rubber, and do not have high levels of residual accelerators included therein, the potential for Type I allergic reactions and Type IV allergic reactions is reduced or eliminated.

Non-fugitive accelerator compositions may include thiazoles, thiurams, dithiocarbamates, guanidines, thioureas and the like, which are known to cause Type IV allergic reactions in humans.

The compositions and methods of the invention will be described in greater detail below.

Vulcanization Compositions

The vulcanization compositions of the present invention preferably include a source of sulfur, an accelerator composition, and an activator. The accelerator compositions may include a fugitive accelerator and an additional accelerator. According to certain aspects of the invention, in which the allergenicity of the vulcanization composition is being minimized or eliminated, elemental sulfur, a single xanthogen polysulfide fugitive accelerator, zinc oxide, and a single aldehyde-aniline accelerator are used. In rubber technology terminology, "phr" of an ingredient refers to parts (dry weight) of the ingredient per hundred parts (dry weight) of rubber. The additional accelerator (aldehyde-aniline condensate) is in a range from about 0.05 phr to about 0.50 phr, preferably from about 0.075 phr to about 0.35 phr, and more preferably about 0.10 phr to about 0.25 phr. The fugitive accelerator (xanthogen polysulfide) is in a range from about 0.50 phr to about 5.0 phr, preferably from about 0.75 phr to about 3.0 phr, and more preferably from about 1.0 phr to about 2.5 phr. The vulcanization compositions may be used to vulcanize elastomers including natural rubber, polyurethane, polybutadiene, polychloroprene (Neoprene), nitrile rubber, block copolymers of styrene and butadiene, block copolymers of styrene and isoprene, polyisoprene and a combinaton or mixture of the above mentioned polymers or elastomers. In certain preferred aspects of the invention, the elastomer is polyisoprene. The polyisoprene can be natural or synthetic.

In aspects of the invention in which the allergenicity of the vulcanization composition is being minimized or eliminated altogether, the source of sulfur used in the vulcanization composition comprises elemental sulfur. According to certain aspects of the invention, only elemental sulfur is used. The elemental sulfur is in the range from about 0.5 to about 3 phr, preferably from about 1 to 2 phr, and more preferably from 1 to about 1.5 phr.

The vulcanization activator may include, but is not limited to, zinc oxide, magnesium oxide, lead oxide, and combinations thereof. Zinc oxide is used as a vulcanization activator in certain aspects of the invention. The activator is in a range from about 0.1 to about 2.0 phr, preferably from about 0.1 to about 1.0 phr, and more preferably from about 0.2 to about 0.8 phr.

In aspects of the invention in which the allergenicity of the vulcanization composition is being minimized or eliminated altogether, one vulcanization accelerator used in accordance with aspects of the invention is a fugitive xanthogen polysulfide. According to some aspects, the fugitive xanthogen polysulfide is a polysulfide that includes two or more than two sulfide groups, i.e., three sulfide groups (trisulfide), four sulfide groups (tetrasulfide), five sulfide groups (pentasulfide), etc. According to further aspects of the invention, the fugitive xanthogen polysulfide includes dihydrocarbyl xanthogen polysulfides (which includes dialkyl xanthogen polysulfides comprising diisopropyl xanthogen polysulfide (DIXP), diisopropyl xanthogen disulfide, diisopropyl xanthogen trisulfide, diisopropyl xanthogen tetrasulfide, diisopropyl xanthogen pentasulfide, diisoamyl xanthogen trisulfide, diisoamyl xanthogen tetrasulfide, diisoamyl xanthogen pentasulfide, diethyl xanthogen tetrasulfide, dibutyl xanthogen tetrasulfide, dibutyl xanthogen disulfide. It should be noted that these fugitive xanthogen polysulfide accelerators can also serve as sulfur donors. In an aspect of the invention, the sulfur donor has a low allergenic potential.

Additional accelerator compositions utilized in this invention can include aldehyde amines. More specifically, these aldehyde amines can be aldehyde anilines. More specifically, the additional accelerator is an aldehyde—aniline condensate. The inventive accelerators include heptaldehyde-aniline (HA) condensate and butyraldehyde-aniline (BA) condensate, but other aldehyde-anilines may be use. In a preferred embodiment, heptaldehyde-aniline (HA) is the additional accelerator.

In certain aspects of the invention, only a single fugitive xanthogen polysulfide vulcanization accelerator is used in the accelerator composition and only a single aldehyde-aniline accelerator is used, and any additional vulcanization accelerators are excluded from the accelerator composition.

According to further aspects of the invention, DIXP and HA are the only vulcanization accelerators, and are the only compounds that function as a vulcanization accelerator that is included in the accelerator composition. When accelerator compositions having reduced or eliminated allergenicity are prepared in accordance with the present invention, they may beneficially comprise only DIXP and HA. Any additional compounds that may also function as vulcanization accelerators are excluded from the accelerator compositions. In another aspect, additional fugitive accelerators may be included in the accelerator compositions, but additional non-fugitive accelerators are excluded. The exclusions in either aspect are beneficial because the presence of any additional vulcanization accelerators or the use of additional non-fugitive accelerators increases the likelihood that an allergic reaction, particularly a Type IV allergic reaction, may occur in a user of an elastomeric article formed with the vulcanization composition.

Latex Dispersions and Elastomeric Articles

The vulcanization compositions of the present invention may be used to prepare latex dispersions. The latex dispersion may comprise an elastomer that may be selected from natural rubber, polyurethane, polybutadiene, polychloroprene (Neoprene), nitrile rubber, block copolymers of styrene and butadiene, block copolymers of styrene and isoprene, polyisoprene and a combination or mixture of the above mentioned polymers or elastomers. According to certain aspects, a particularly preferred elastomer for use in the latex dispersions of the invention is polyisoprene. These latex dispersions may comprise, in addition to the elastomer and vulcanization composition, one or more different non-curing ingredients. The non-curing ingredients may include, but are not limited to, antioxidants, stabilizers, plasticizers, anti-ozone agents, pigments, and fillers. According to an aspect of the invention, when making an elastomeric article (e.g., as described in U.S. Pat. No. 8,110,266 or 6,828,387, both of which are incorporated herein by reference in its entirety) the total solids content of the latex dispersion is in a range from about 25% to about 49%.

The latex dispersions of the present invention that contain an elastomer and vulcanization composition may be used in methods for preparing elastomeric articles such as gloves, specifically medical gloves, and more specifically examination and surgical gloves. However, it is considered within the ability of those skilled in the art to prepare alternative elastomeric articles other than gloves, including, but not limited to, condoms, probe covers, dental dams, finger cots, catheters, and the like, using the guidance provided herein.

The elastomeric articles of the present invention that are formed using the vulcanization compositions and/or latex dispersions described above may be produced using any conventional manufacturing methods, e.g., coagulant dipping. In the "anode" coagulant-dipping process, a coagulant-coated former is dipped into the dispersion, and is then cured to form a finished article. In the "Teague" coagulant-dipping process, the former is dipped into the dispersion, and is then dipped into a coagulant, followed by curing to form a finished article. These methods utilize dispersions containing the elastomer from which the finished article is to be formed. Preferred elastomers include natural rubber, polyurethane, polybutadiene, polychloroprene (Neoprene), nitrile rubber, block copolymers of styrene and butadiene, block copolymers of styrene and isoprene, and polyisoprene. According to certain aspects, a particularly preferred elastomer is polyisoprene. According to still further aspects, a polyisoprene elastomeric article is provided that is vulcanized using an vulcanization composition consisting of Sulfur, Zinc Oxide, HA and DIXP.

HA has not been previously utilized for rubber gloves. The present invention has unexpectedly discovered that it is possible to vulcanize polyisoprene latex with a vulcanization composition consisting of Sulfur, Zinc Oxide, HA and DIXP in order to obtain an elastomeric article having a tensile strength that meets the ASTM 3577-09 standard requirements for rubber surgical gloves (natural rubber) of 24 MPa (minimum) before aging and 18 MPa after aging, as well as the ASTM D3577-09 standard requirements for synthetic rubber surgical gloves of 17 MPa (minimum) before aging and 12 MPa (minimum) after aging. Because DIXP is a fugitive xanthogen polysulfide, and no DIXP residue remains on the gloves following vulcanization, along with low required amounts of HA, the gloves produced using this vulcanization composition exhibit low allergenic potential.

The elastomeric articles of the present invention may be formed using latex dispersions containing any additives components that may be used in forming the elastomeric articles, which may include at least one of curing ingredients, non-curing ingredients, and additional polymers, to be discussed below, with the same, similar or different chemical structures from the elastomer. The total amount of additive(s) used is about 0.5-49% by weight of total dispersion phase solids.

When curing using sulfur, the main curing agent preferably comprises elemental sulfur and/or a sulfur donor that has low or no allergenic potential. According to certain aspects of the invention, only elemental sulfur is used.

Activators may include, but are not limited to, zinc oxide, magnesium oxide, and lead oxide. Zinc oxide is the most commonly used vulcanization activator. In one embodiment, zinc oxide is used as the activator.

Vulcanization accelerators in accordance with the invention are fugitive xanthogen polysulfides and aldehyde-anilines. According to further aspects of the invention, the fugitive xanthogen polysulfide is diisopropyl xanthogen polysulfide (DIXP). Other xanthogen polysulfides or dihydrocarbyl xanthogen polysulfides (which includes dialkyl xanthogen polysulfide) comprise diisopropyl xanthogen disulfide, diisopropyl xanthogen trisulfide, diisopropyl xanthogen tetrasulfide, diisopropyl xanthogen pentasulfide, diisoamyl xanthogen trisulfide, diisoamyl xanthogen tetrasulfide, diisoamyl xanthogen pentasulfide, diethyl xanthogen tetrasulfide, dibutyl xanthogen tetrasulfide, dibutyl xanthogen disulfide. In one aspect, the aldehyde-aniline is HA.

Any non-curing ingredients that are conventionally used in elastomer dispersion compounding formulations may be used in the present invention. For example, the non-curing ingredients may include, but are not limited to, antioxidants, stabilizers, plasticizers, anti-ozone agents, pigments, and fillers.

Suitable antioxidants that may be added to the elastomer dispersion include, but are not limited to, hindered phenols such as butylated hydroxytoluene (2,6-d i-tert-butyl-4-methylphenol) and thiodiethylene bis-di-t-butyl-4-hydroxyphenyl propionate, hindered polyphenolics such as butylated reaction products of p-cresol and dicyclopentadiene, hindered phenol/hindered polyphenolics such as trimethyl-tris (di-t-butyl-4-hydroxybenzym)-benzene or octadecyl di-t-butyl-4-hydroxyphenyl propionate, amines such as a blend of 6PPD with methyl styrene and bis-alpha-dimethylbenzyl diphenyl amine, mixtures such as zinc mercaptotulumimidazole/phenolic, triazinone derivatives such as triazinone-phenol mixtures, polyaromatic amines such as poly(m-anisidine), phenolic antioxidant hydrazides such as phenolics with anhydride copolymer, phenolics such as 2,2'-methylene-bis-(4-methyl-6-t-butylphenol), cresols such as 2,4-dimethyl-6-(1-methylcyclohexyl)-p-cresol, and styrenated phenols. One particularly preferred antioxidant is butylated reaction products of p-cresol and dicyclopentadiene (e.g., Wingstay L).

Colloidal stabilizers including alkalis for pH adjustment, surfactants and alkaline caseinates such as sodium caseinate may also be added to the aqueous phase.

Suitable plasticizers that may be added to the elastomer dispersion may include, but are not limited to, fatty salts, mineral oils and ester plasticizers.

According to some aspects, an antiozonant is added to an elastomer dispersion that is used to make the elastomeric articles of the invention. Ozone can severely damage some elastomeric articles, such as those formed from polymers that are highly unsaturated, like polyisoprene. When included in the aqueous elastomer dispersion of the invention, certain high molecular weight polymers, such as waxes, EPDM and hydrogenated polydiene can provide such articles with excellent ozone resistance. Waxes form a physical barrier at the surface of the rubber which protects against ozone attack. There are two types of waxes: straight chain paraffin waxes and branched-chain microcrystalline waxes. The most widely used antiozonant waxes are blends of paraffin and microcrystalline waxes for maximum protection over a broad range of exposure temperatures. Paraffin waxes are straight-chain hydrocarbon molecules containing about 20 to 50 carbon atoms. Suitable paraffin waxes have a melting point of from about 50 to 75° C., preferably 52 to 68° C. Microcrystalline waxes are also known as amorphous waxes and are hydrocarbons, similar to paraffin waxes, but the carbon chains are branched and have higher molecular weight of about 40 to 70 carbon atoms per chain. Other examples of antiozonants that may be used in the invention may include, but are not limited to, alkyl/aryl p-phenylenediamines such as N-1,3-dimethylbutyl-N'-phenyl-p-phenylenediamine 6PPD, organoclay-antiozonant complexes such as smectite-containing clay with alkyl-aryl-p-phenylenediamine, functionalized benzotriazoles such as N,N-disubstituted para-phenylenediamine, triazines such as tris (N-1,4-dimethylpentyl-p-phenylenediamino) 1,3,5-triazine and tris (N-alkyl-p-phenylenediamino) 1,3,5-triazine, and p-phenylenediamines such as N-isopropyl-N'-phenyl-p-phenylenediamine (IPPD). In addition, polymers including waxes such as paraffinic wax (MW=300-500), microcrystalline wax (MW=600-700) (with paraffinic wax) and low MW PE wax (MW=100-1100), polymeric antiozonants such as polymeric diphenyldiamine, and ozone inert polymers such as EPDM and brominated isobutylene/para-methylstyrene copolymer (BIMSM) may be used as antiozonants. It is preferred that waxes are used. One particularly preferred wax is Michem Lube 180. Another preferred wax dispersion is Antilux 600.

Suitable pigments that may be added to the aqueous elastomer dispersion may include a wide range of natural pigments such as titanium dioxide and iron oxides, and synthetic pigments.

Suitable fillers that may be added to the aqueous elastomer dispersion may include, but are not limited to, inorganic fillers such as clays, calcium carbonate, talc, and silica and organic fillers such as crosslinked polymethyl methacrylate, finely divided urethane resin particles and polyethylene microspheres.

Additional polymers may also be incorporated into the latex dispersions and elastomeric articles of the present invention. This may be done to provide additional functionality or impart beneficial properties to the latex dispersions and elastomeric articles. Such functions/properties may include, but are not limited to, improved damp/wet donning, improved fluid repellency, improved resistance to microorganisms, improved resistance to degradation, etc. According to some aspects of the invention, the additional polymer is selected from natural rubber, polyurethane, polybutadiene, polychloroprene (Neoprene), nitrile rubber, block copolymers of styrene and butadiene, block copolymers of styrene and isoprene, and polyisoprene.

According to some aspects of the invention, elastomeric articles are provided that include multiple elastomeric layers, where the multiple elastomeric layers may have the same or different compositions. For example, a coating comprising synthetic polyisoprene blended with polychloroprene may be applied to a polychloroprene elastomeric article to provide improved damp/wet donning characteristics to the article. In another example, a coating composition comprising nitrile blended with polychloroprene may be applied to a polychloroprene elastomeric article to provide improved damp/wet donning characteristics to the article. In another example, a coating composition comprising nitrile blended with polyisoprene may be applied to a polyisoprene elastomeric article to provide improved damp/wet donning characteristics to the article. In another example, a coating composition comprising polyisoprene blended with an polyacrylate may be applied to a polyisoprene elastomeric article to provide improved damp/wet donning characteristics to the article. In one instance, an elastomeric article has multiple layers of polyisoprene.

According to further aspects of the invention, the elastomeric articles may be formed either with, or without, powder or starch. Although powder and starch are commonly-used donning agents, they could be also associated with allergic reactions, and therefore another aspect of the invention relates to powder-free and starch-free elastomeric articles. Further aspects relate to substantially power-free and starch-free elastomeric articles in which less than 5 mg of powder or starch, preferably less than 3 mg of powder or starch, more preferably less than 2 mg of power or starch, and most preferably less than 1 mg of powder or starch. These articles are prepared using the vulcanization compositions described above.

These and other aspects of the invention are further described in the non-limiting Examples set forth below.

Preparation of Gloves

Synthetic Polyisoprene or Natural Rubber polyisoprene gloves were prepared using the standard coagulant dipping process, and using the base compound formulation of Table 1 in combination with the accelerator composition for synthetic polyisoprene (Table 2) or the accelerator composition for natural rubber polyisoprene (Table 3).

The following preparation can be utilized (incorporating the specifications of U.S. Pat. Nos. 8,110,266 and 6,828,387, by reference, in their entirety), but any standard dipping process is applicable.

The vulcanization composition comprises synthetic polyisoprene latex, colloid stabilisers (potasium recinoleate, and potasium hydroxide which also acts as pH adjuster), crosslinking agent (sulfur), activator (zinc oxide) and antioxidant (Winstay L)—(Table 1 Base Compound), and accelerator composition comprising DIXP and heptaldehyde-aniline (Tables 2 and 3). For preparing the latex composition, the various ingredients are added to the polyisoprene latex while stirring. The various ingredients are in the form of aqueous solution or aqueous dispersion so as to be compatible with the latex as per common practice in latex technology. Hence, water soluble ingredients are dissolved in water and added as an aqueous solution while water-insoluble solid ingredients and water insoluble liquid ingredients are dispersed in water and added as aqueous dispersions. After all the ingredients are added, water is added to dilute the compounded latex to about 35% total solids and the pH of the latex is adjusted to about 11 for synthetic polyisoprene or about 10 for natural rubber polyisoprene.

The fully compounded latex is stirred and left to mature at ambient temperature of about 28° C.-32° C. until it is ready for dipping.

Preparation of Powder-Free Gloves

For evaluation of the different latex compositions, gloves are prepared by coagulant dipping using ceramic molds (or formers).

Clean ceramic molds are pre-heated to 55-58° C. in a hot air oven. The molds are dipped into aqueous calcium nitrate coagulant solution (55-58° C., specific gravity about 1.130) which also contained calcium carbonate (about 4.0-5.0% as mold release agent) and Surfynol TG (wetting agent, about 0.15%). The coagulant-coated molds are dried in an oven (60° C. for about 10 min) and then dipped into the latex composition. The dwell time in the latex is about 15 seconds when the total solids content of the latex composition is 33.5%. This gives dry film thickness of about 0.20 mm. (the dwell time and latex total solids content may be varied to obtain this film thickness). The latex films on the molds are hang in the air for about 5 minutes to enable the latex films to form a good gel. The latex films are then dipped into hot water at about 60° C. for leaching for 5 minutes whereby water-soluble materials e.g. calcium nitrate and surfactants are leached out. The films on the molds are hanged vertically at ambient temperature for drying for about 5 minutes. The films are then put into the oven for drying and curing at 135° C. for 30 minutes. The curing temperature and time may be adjusted to get the desired peoperties. After vulcanization, the gloves are cooled down to about ambient temperature and modified starch is lightly applied on the films before the gloves are stripped from the molds whereby they are turned inside out. The powdered gloves obtained are referred to as formed gloves.

Chlorination

For making powder-free gloves, the gloves are post-processed by chlorination.

The gloves are turned inside-out again so that the surface not in contact with the mold during dipping is on the outside of the glove again. The chlorination consists of prewashing the glove with water before chlorination in an aqueous chlorine solution containing about 300 ppm available chlorine (range 200 to 700 ppm may be used), neutralizing any excess chlorine with sodium hydroxide solution, followed by further washing with water (this step is carried out several times). The chlorine level may be adjusted to impart the desired properties like reduced friction and stickiness on both the surfaces of the final finished gloves. The glove are then partially dried and then manually inverted again and dried further.

Lubrication

For good donning with wet or damp hands, the wet gloves are transferred to a tumbling washer for a further lubrication process following the chlorination step before drying the gloves. This lubrication process includes tumbling the gloves with an aqueous solution comprising about 1.0% cetylpyridium chloride, 1.0% silicone emulsion, and 1.5% ammonium salts of alkyl phosphates. The level of these three ingredients may be varied to obtain the desired properties on the finished gloves. The gloves are removed from the tumbler washer, partially dried, and manually inverted. The gloves are then dried further. The treated glove could be easily donned by dry or damp hands.

(For chlorination and lubrication processes, see U.S. Pat. No. 7,566,502 which is incorporated by reference).

Examples

Examples described below are for either natural rubber or synthetic polyisoprene. The base compound used for both is the same and shown below in Table 1.

TABLE 1

Base Compound for synthetic polyisoprene and natural rubber polyisoprene in phr (phr = parts (dry weight) of the ingredient per hundred parts (dry weight) of rubber).

| Ingredients | Dry Weight (phr) |
| --- | --- |
| Polyisoprene | 100 |
| Potasium recinoleate | 2 |
| Potasium hydroxide | 0.3 |
| Sulfur | 1.3 |
| Zinc oxide | 0.3 |
| Wingstay L | 2 |

Vulcanization compositions for synthetic polyisoprene

Examples 1-10 are for synthetic polyisoprene, the composition of the compounding formulation comprises the Base Compound shown in Table 1 and the Accelerator Composition shown in Table 2 (in phr). For Examples 1-8, the accelerator compositions (table 2) comprise various levels of Heptaldehyde-aniline (HA) (0.05-0.50 phr) in combination with various levels of DIXP (0.50-5.00 phr). Examples 9 and 10 have DIXP or HA, but not both. Gloves were formed by the standard coagulant dipping process, and were vulcanized using hot air. The properties of the gloves are shown in Table 4.

TABLE 2

Accelerator Composition for Synthetic Polyisoprene (in phr)

| Ingredient | Example/Weight (phr) | | | | | | | | | |
|---|---|---|---|---|---|---|---|---|---|---|
| | 1 | 2 | 3 | 4 | 5 | 6 | 7 | 8 | 9 | 10 |
| Heptaldehyde-aniline | 0.05 | 0.075 | 0.10 | 0.15 | 0.20 | 0.25 | 0.35 | 0.50 | 0.50 | 0 |
| DIXP | 5.00 | 3.00 | 2.50 | 2.00 | 1.50 | 1.00 | 0.75 | 0.50 | 0 | 5.00 |

Vulcanization composition for natural rubber polyisoprene

For Examples 11-16 for natural rubber polyisoprene, the composition of the compounding formulation comprises of the Base Compound shown in Table 1 and the Accelerator Composition shown in Table 3. Gloves were formed by the standard coagulant dipping process, and were vulcanized using hot air. The properties of the gloves are shown in Table 5.

TABLE 3

Accelerator Composition for Natural Rubber Polyisoprene

| Ingredient | Example/Weight component (phr) | | | | | |
|---|---|---|---|---|---|---|
| | 11 | 12 | 13 | 14 | 15 | 16 |
| Heptaldehyde-aniline | 0.05 | 0.075 | 0.10 | 0.15 | 0.20 | 0.25 |
| DIXP | 3.00 | 2.50 | 2.00 | 1.50 | 1.00 | 0.50 |

Physical Properties of Polyisoprene Gloves

Tensile Strength

Tensile strength is measured in accordance to ASTM D412, "Standard Test Methods for Vulcanized Rubber and Thermoplastic Elastomers-Tension". The ASTM specification for surgical gloves is defined in ASTM D3577-09, Standard Specification for Rubber Surgical Gloves. The specification defines natural rubber latex as Type 1 and synthetic rubber latex as type 2.

Physical Properties of Synthetic Polyisoprene Gloves

The tensile strength specification for synthetic rubber surgical gloves as stated in "ASTM D3577-09 Standard Specification for Rubber Surgical Gloves" is minimum 17 MPa before aging and minimum 12 MPa after accelerated aging.

TABLE 4

Tensile strength (TS) properties of Synthetic Polyisoprene (in MPa)

| | Day 1 | | | | Day 2 | | | | Day 3 | | | | Day 7 | | | |
|---|---|---|---|---|---|---|---|---|---|---|---|---|---|---|---|---|
| | Formed TS (MPa) | | Chlorinated TS (MPa) | | Formed TS (MPa) | | Chlorinated TS (MPa) | | Formed TS (MPa) | | Chlorinated TS (MPa) | | Formed TS (MPa) | | Chlorinated TS (MPa) | |
| Example | Unaged | Aged | Unaged | Aged | Unaged | Aged | Unaged | Aged | Unaged | Aged | Unaged | Aged | Unaged | Aged | Unaged | Aged |
| 1 | 14.0 | 7.7 | 13.7 | 10.8 | 17.3 | 12.5 | 22.4 | 17.5 | 22.7 | 18.5 | 24.7 | 16.0 | 23.7 | 16.8 | 20.2 | 15.6 |
| 2 | 18.3 | 12.3 | 17.5 | 12.3 | 19.6 | 16.5 | 20.6 | 17.5 | 20.4 | 15.3 | 20.6 | 16.8 | 21.0 | 19.6 | 22.3 | 17.7 |
| 3 | 19.3 | 14.9 | 20.0 | 15.5 | 20.2 | 16.8 | 21.3 | 16.2 | 21.4 | 17.0 | 21.9 | 17.0 | 23.2 | 18.8 | 23.6 | 18.7 |
| 4 | 20.0 | 16.4 | 22.0 | 17.7 | 17.7 | 14.6 | 20.7 | 15.5 | 19.2 | 14.8 | 22.3 | 15.9 | 19.8 | 15.4 | 24.5 | 16.0 |
| 5 | 20.1 | 16.8 | 21.1 | 16.1 | 19.3 | 18.1 | 19.6 | 15.2 | 18.1 | 15.7 | 21.5 | 15.5 | 18.0 | 14.7 | 21.2 | 16.1 |
| 6 | 17.5 | 17.0 | 19.2 | 18.2 | 19.0 | 21.0 | 23.0 | 20.0 | 21.4 | 19.6 | 23.4 | 20.6 | 20.1 | 20.8 | 22.7 | 22.1 |
| 7 | 17.9 | 14.2 | 17.5 | 14.9 | 20.5 | 18.9 | 20.1 | 20.8 | 18.4 | 16.8 | 21.2 | 16.2 | 17.8 | 14.7 | 20.2 | 15.6 |
| 8 | 17.9 | 14.2 | 17.2 | 14.9 | 20.5 | 18.9 | 20.1 | 20.8 | 18.4 | 17.4 | 21.2 | 16.2 | 17.8 | 14.7 | 20.2 | 15.6 |
| 9 | 1.5 | 0.6 | 1.2 | stuck | 0.4 | 0.7 | 1.3 | Stuck | 0.4 | 0.5 | 0.4 | stuck | — | — | — | — |
| 10 | 4.0 | 0.9 | 5.7 | 5.8 | 4.8 | 11.8 | 3.9 | 7.2 | 4.0 | 4.5 | 7.5 | 5.5 | 7.7 | 5.9 | 8.9 | 7.6 |

The tensile properties of the formed gloves and chlorinated gloves (both unaged and aged) for 1 to 7 day latex maturation are shown in Table 4. In the eight accelerator compositions containing both DIXP and HA, at maturation time of 2-7 days could yield formed (i.e. powdered) and chlorinated (i.e. powder-free) gloves that could meet ASTM D3577 tensile strength requirements, both unaged and aged, for synthetic rubber surgical gloves.

Unaged can be defined as "initial or current stage"; or "not having been aged" or "before aging". Aged can be defined as "after aging". According to ASTM D3577 standard—section 8.5: Physical Requirement Test, all surgical gloves shall conform to the physical requirements (before and after accelerated aging) that is specified in Table #3. Accelerated aging tests shall be conducted in accordance with Test Method D573. The accelerated aging conditions are: After being subjected to a temperature of 70 C+/−2 C for 166 h+/−2 h; After being subjected to a temperature of 100 C+/−2 C for 22 h+/−0.3 h.

For 1 day maturation, with the exception of accelerator composition 1, all the other 7 accelerator compositions could yield formed and chlorinated gloves that could meet the ASTM D3577 tensile strength requirements, both synthetic rubber polyisoprene) as discussed below in Examples 11-16.

For Examples 11-16, the accelerator compositions (Table 3), comprise various levels of HA (0.05-0.25 phr) in combination with various levels of DIXP (0.50-3.0 phr).

The tensile strength properties of the films for Examples 11-1 are shown in Table 5.

TABLE 5

Tensile Strength of Natural Rubber Polyisoprene Gloves

| | Day 1 | | | | Day 2 | | | | Day 3 | | | | Day 7 | | | |
|---|---|---|---|---|---|---|---|---|---|---|---|---|---|---|---|---|
| | Formed TS (MPa) | | Chlorinated TS (MPa) | | Formed TS (MPa) | | Chlorinated TS (MPa) | | Formed TS (MPa) | | Chlorinated TS (MPa) | | Formed TS (MPa) | | Chlorinated TS (MPa) | |
| Example | Unaged | Aged | Unaged | Aged | Unaged | Aged | Unaged | Aged | Unaged | Aged | Unaged | Aged | Unaged | Aged | Unaged | Aged |
| 11 | 27.9 | 25.6 | 32.4 | 27.3 | 26.5 | 23.4 | 31.4 | 26.6 | 24.8 | 22.4 | 29.5 | 26.5 | 27.6 | 26.5 | 30 | 26.4 |
| 12 | 28.1 | 24.2 | 33.2 | 23.6 | 28.6 | 25.6 | 26.3 | 25.2 | 27.8 | 27.8 | 29.6 | 23.9 | 30.1 | 26.6 | 37.2 | 29 |
| 13 | 25.2 | 21.2 | 25.2 | 21.9 | 29 | 29.1 | 25.6 | 24.7 | 26.5 | 27.5 | 24.8 | 24.5 | 27.0 | 25.0 | 26.8 | 25.0 |
| 14 | 30.2 | 29.9 | 21.9 | 23.8 | 29.5 | 31.7 | 25.9 | 27.5 | 31.8 | 29.2 | 25.5 | 27.2 | 26.4 | 25.7 | 27.0 | 28.0 |
| 15 | 20.2 | 17.2 | . . . | . . . | 24.3 | 25.6 | 33.6 | 35.3 | 30.1 | 28.4 | 35.3 | 31.2 | 24.6 | 35.9 | 36.3 | 33.2 |
| 16 | 32.5 | 33.6 | 37.1 | 33.9 | 34.6 | 32.1 | 38.2 | 31.5 | 22.7 | 33.2 | 38.8 | 32.1 | 29.1 | 30.7 | 35.4 | 29.2 | unaged and aged, for synthetic rubber surgical gloves. Examples 9 & 10 containing only DIXP or HA did not meet tensile strength requirements.

Using a high level of DIXP of 5.0 phr and no HA (Example 9), the unaged tensile strength (2-3 days maturation) was low (4.0-4.8 MPa) for formed gloves and 3.9-7.5 MPa for chlorinated gloves. Again using a high level of HA of 0.5 phr and no DIXP (Example 10), the unaged tensile strength (2-3 days maturation) was low (0.4 MPa) for formed gloves and 0.4-1.3 MPa for chlorinated gloves. Hence, accelerator compositions comprising only DIXP or only HA, even at high levels, give low tensile strength properties that could not meet the requirements of ASTM D3577 for synthetic surgical gloves.

However, it was surprisingly found that 5.0 phr DIXP in combination with a very low level of HA of 0.05 phr (Example 1), the unaged tensile strength (2-3 days maturation) increased dramatically to 17.3-22.7 MPa for formed gloves and 22.4-24.7 MPa for chlorinated gloves i.e. these tensile properties meet the requirements of ASTM D3577 for synthetic surgical gloves. These results clearly demonstrate strong synergism between DIXP and HA.

Also, using a high level of HA of 0.5 phr without DIXP (Example 10), the unaged tensile strength (2-3 days maturation) was low (0.4 MPa) for formed gloves and 0.4-1.3 MPa for chlorinated gloves. However, it was again surprisingly found that 0.50 phr HA in combination with a low level of DIXP of 0.50 phr (Example 8), the unaged tensile strength (2-3 days maturation) increased dramatically to 18.4-20.5 MPa for formed gloves and 20.1-21.2 MPa for chlorinated gloves.

Physical Properties of Natural Rubber Polyisoprene Gloves

The tensile strength specification for natural rubber (polyisoprene) surgical gloves stated in ASTM D3577 is higher than that for synthetic rubber (polyisoprene) surgical gloves, minimum 24 MPa before aging and 18 MPa after accelerated aging. It was found that the inventive composition also works very well for natural rubber polyisoprene. In fact, the inventive accelerator composition can meet these higher tensile strength specification for natural rubber polyisoprene even at lower levels of DIXP and HA (compared to that for The tensile strength specification for natural rubber surgical gloves as stated in "ASTM D3577-09 Standard Specification for Rubber Surgical Gloves" is minimum 24 MPa before aging and minimum 18 MPa after accelerated aging.

From Table 5, it is seen that with the exception of accelerator composition 15 (Example 15) at 1 day maturation of the compounded latex, all accelerator composition at 1 day to 7 days maturation of the compounded latex could yield gloves that can meet the ASTM D3577 tensile strength specification for natural rubber (polyisoprene) surgical gloves. This is applicable to both the powdered (i.e. formed) and powder-free (i.e. chlorinated) samples and also before aging of the samples as well as after accelerated aging of the samples.

Residual DIXP

Samples of the formed gloves (i.e. without the chlorination process) from Examples 1 (synthetic polyisoprene, 5.0 phr DIXP, 0.05 phr HA), Example 2 (synthetic polyisoprene, 3.0 phr DIXP, 0.075 HA) and Example 11 (natural rubber polyisoprene, 3.0 phr DIXP, 0.05 phr HA) have been tested for residual DIXP using UV spectroscopy and HPLC methods.

The formed gloves were extracted with spectroscopy grade hexane and UV spectra of the hexane extracts were analyzed. The results showed that there were no residual DIXP from the formed gloves from all the three Examples.

For HPLC analysis, the hexane from the hexane extract was evaporated off and the residue dissolved in a mixture of 50:50 dichloromethane/methanol and then analyzed using HPLC. The results again showed the complete absence of residual DIXP in the formed gloves from all the three Examples.

These results confirmed that DIXP is indeed fugitive. The limit of detection of both test methods is 1 ppm.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of considerable modification, alteration, and equivalents in form and function, as will occur to those ordinarily skilled in the pertinent arts having the benefit of this disclosure.

While the present invention has been described for what are presently considered the preferred embodiments, the invention is not so limited. To the contrary, the invention is intended to cover various modifications and equivalent arrangements included within the spirit and scope of the detailed description provided above.

The foregoing description is provided to enable any person skilled in the art to practice the various example implementations described herein. Various modifications to these variations will be readily apparent to those skilled in the art, and the generic principles defined herein may be applied to other implementations. All structural and functional equivalents to the elements of the various illustrious examples described throughout this disclosure that are known or later come to be known to those of ordinary skill in the art are expressly incorporated herein by reference.

The invention claimed is:

1. An elastomeric article comprising:
a rubber component comprising polyisoprene, and
an aldehyde aniline condensate,
wherein the elastomeric article comprises less than 1 ppm diisopropyl xanthogen polysulfide residue.

2. The elastomeric article of claim 1, wherein the elastomeric article meets a minimum requirement of 24 MPa when measured according to ASTM 3577-09 for natural rubber surgical gloves before aging.

3. The elastomeric article of claim 1, wherein the elastomeric article meets a minimum requirement of 18 MPa when measured according to ASTM 3577-09 for natural rubber surgical gloves after aging.

4. The elastomeric article of claim 1, wherein the elastomeric article meets a minimum requirement of 17 MPa when measured according to ASTM 3577-09 for synthetic rubber surgical gloves before aging.

5. The elastomeric article of claim 1, wherein the elastomeric article meets a minimum requirement of 12 MPa when measured according to ASTM 3577-09 for synthetic rubber surgical gloves after aging.

6. The elastomeric article of claim 1, wherein the elastomeric article is free of dithiocarbamates, thiurams, thiazoles, guanidines, and thioureas.

7. The elastomeric article of claim 1, wherein the elastomeric article is free of diisopropyl xanthogen polysulfide residue.

8. The elastomeric article of claim 1, further comprising sulfur.

9. The elastomeric article of claim 1, wherein the polyisoprene comprises natural polyisoprene.

10. The elastomeric article of claim 1, wherein the polyisoprene comprises synthetic polyisoprene.

11. The elastomeric article of claim 1, wherein the aldehyde aniline is selected from the group consisting of butyraldehyde-aniline, heptaldehyde-aniline, and a combination thereof.

12. The elastomeric article of claim 11, wherein the aldehyde aniline is heptaldehyde-aniline.

13. The elastomeric article of claim 1, wherein the elastomeric article is free of additional xanthate compounds.

14. The elastomeric article of claim 1, wherein the elastomeric article is free of additional compounds that function as accelerators for vulcanizing elastomers.

15. The elastomeric article of claim 1, wherein the elastomeric article is chlorinated.

16. The elastomeric article of claim 1, wherein the elastomeric article is selected from the group consisting of gloves, probe covers, finger cots, catheters, dental dams, and condoms.

17. The elastomeric article of claim 16, wherein the elastomeric article is a glove.

18. The elastomeric article of claim 1, wherein the elastomeric article is powder free.

19. The elastomeric article of claim 1, wherein the elastomeric article is lubricated.

20. The elastomeric article of claim 1, wherein the elastomeric article comprises between about 0.05 and 0.5 phr of the aldehyde aniline condensate.

* * * * *